United States Patent

[11] 3,543,953

| [72] | Inventor | Catharinus M. Ponsen<br>Lomita, California |
|---|---|---|
| [21] | Appl. No. | 812,537 |
| [22] | Filed | March 12, 1969<br>Continuation-in-part of Ser. No.<br>754,175, Aug. 21, 1968, now pending. |
| [45] | Patented | Dec. 1, 1970 |
| [73] | Assignee | Colin Craig<br>Westminster, California<br>a part interest |

[54] CARGO HANDLING APPARATUS
6 Claims, 8 Drawing Figs.

[52] U.S. Cl. ...................................................... 214/15;
212/15
[51] Int. Cl. ...................................................... B63b 27/10
[50] Field of Search .......................................... 214/14, 15,
15(D); 212/13, 14, 15

[56] References Cited
UNITED STATES PATENTS
749,860   1/1904   Mc L. Harding .............   214/14

1,207,226   12/1916   Schilling ......................   212/15UX
1,327,071   1/1920   Taylor ..........................   214/38.42UX Primary Examiner—Robert G. Sheridan
Assistant Examiner—Frank E. Werner
Attorney—Fulwider, Patton, Rieber, Lee and Utecht ABSTRACT: The present application relates to cargo handling apparatus. The cargo handling apparatus includes a pair of rails extending longitudinally on opposite sides of the hatchway of a cargo ship and mounting a frame supporting an endless track. The track forms a portion which extends over the hatchway and a section which projects transversely beyond the side of the hull for disposition over a dock against which said ship is docked. A plurality of hoists are carried on the track whereby an empty hoist may be moved into position over the hatchway for receiving cargo from the hold and the loaded hoist may be moved on around the track for dispensing the cargo on the dock and subsequent return to the hatchway for receiving additional cargo.

INVENTOR.
CATHARINUS M. PONSEN

INVENTOR.
CATHARINUS M. PONSEN

ATTORNEYS

INVENTOR.
*CATHARINUS M. PONSEN*

BY *Fulwider, Patton, Rieber, Lee and Utecht*

ATTORNEYS

CARGO HANDLING APPARATUS

CROSS REFERENCE TO RELATED APPLICATIONS

This application is a continuation-in-part of an application filed Aug. 21, 1968 and bearing the Ser. No. 754,175.

BACKGROUND OF THE INVENTION

1. Field of the Invention

The present invention relates to apparatus for loading and unloading cargo ships.

2. Description of Prior Art

It has been common practice to provide cargo ships with cargo handling booms which unload cargo from the hold of a ship and dispose it on a dock or, alternatively, receive cargo from the dock and dispose it within the hold of the ship. Cargo handling mechanisms of this type have proven rather cumbersome, unwieldy, and inefficient since it is impractical to have any number of booms working in one hatchway. In an attempt to overcome disadvantages of the aforedescribed booms, hoists carried on tracks which extend over the hatchway and project over the dock have been proposed, but such devices are also inefficient because only one hoist can be utilized at any one time.

SUMMARY OF THE INVENTION

The present invention is characterized by an endless track supported over the hatchway of a ship and projecting beyond the side of the ship hull for disposition over an adjacent dock. Hoists are carried on the track whereby empty hoists may be moved sequentially into position over the hatchway from removal of cargo from the ship hold and transferral to the dock.

The objects and advantages of the present invention will become apparent from consideration of the following detailed description when taken in conjunction with the accompanying drawing.

DESCRIPTION OF THE PREFERRED EMBODIMENT

Figure 1:
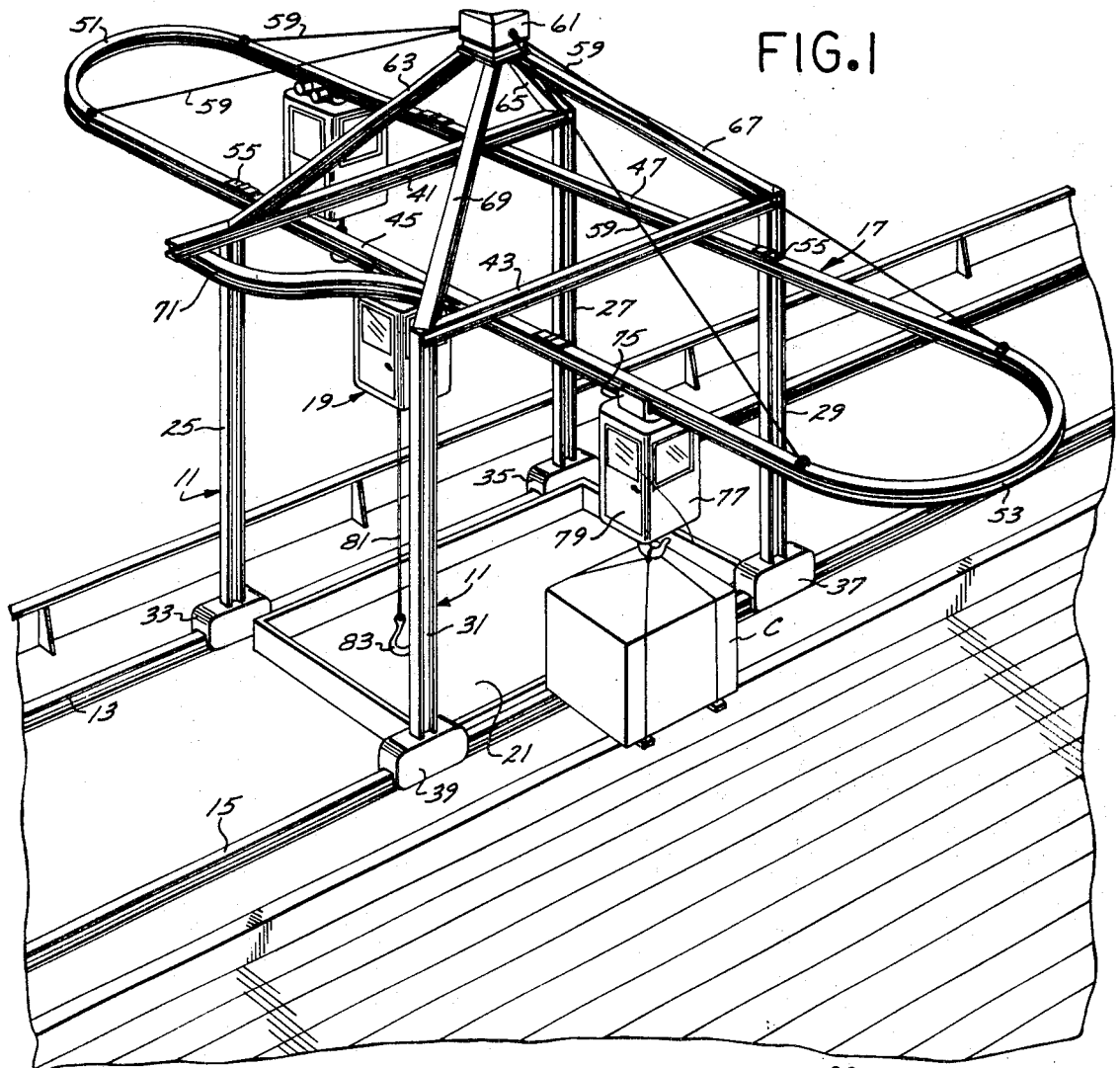
FIG. 1 is a partial perspective view of a cargo handling apparatus embodying the present invention.

The preferred embodiment of the cargo handling apparatus of present invention includes a frame, generally designated 11, mounted on a pair of longitudinal rails 13 and 15 and supporting an endless track, generally designated 17. A plurality of hoisting devices, generally designated 19, are carried on track 17 for sequential movement into position over the hatchway 21 for retrieving cargo C from the hold of the ship S and disposition thereof on the dock 23 (FIGS. 2 and 3) alongside such ship.

The frame 11 includes four corner posts 25, 27, 29, and 31 mounted on individual trucks 33, 35, 37, and 39, respectively. The trucks 33, 35, 37, and 39 have wheels (not shown) which roll on the respective tracks 13 and 15 for convenient movement of the apparatus longitudinally on the deck of the ship S. A pair of longitudinal beams 41 and 43 are supported on top of the posts 25, 27, 29, and 31 and have the endless track 17 supported thereunder.

The track 17 includes two coextensive straight portions 45 and 47 extending transversely over the rails 13 and 15 and further includes a pair of oppositely disposed portions 51 and 53 joining the ends of the portions 45 and 47. The ends of the loop portions 51 and 53 are connected with the straight portions 45 and 47 by means of hinges 55 and the outer ends of such loop portions 51 and 53 are suspended from cables 59 which are connected on their inner ends with winches carried in a housing 61 supported from the frame 11 by means of struts 63, 65, 67, and 69.

A shunt track 71 is carried at the forward end of the frame 11 having its one end disposed adjacent the longitudinal beam 41 for selective receipt of the hoist devices 19 therefrom. A conventional switching mechanism (not shown) is included for selectively pulling the track 71 into position for receiving the hoist devices 19 from the endless track 17 or, alternatively, directing them back onto such track 17.

The hoist devices 19 are suspended from trolleys 75 having rollers received on opposite sides of track 17 for holding such trolleys captive thereon. Cabs 77 are suspended from the trolleys 75 and include doors 79 for entrance of the operator. Housed within the cabs 77 are controls for manipulating a hoist which raises and lowers cables 81 having cargo receiving hooks 83 on the bottom ends thereof.

It will be clear that the rails 13 and 15 may extend over several hatchways 21 whereby the cargo handling apparatus may be selectively utilized for unloading cargos from several different hatchways. Further, the apparatus may be driven on the rails 13 and 15 by means of electric motors (not shown) which receive power from power lines leading from the ships generators. Also, the trolleys 75, and hoists receiving the cables 81 may also be electrically powered from the ship's generator.

Figure 2:
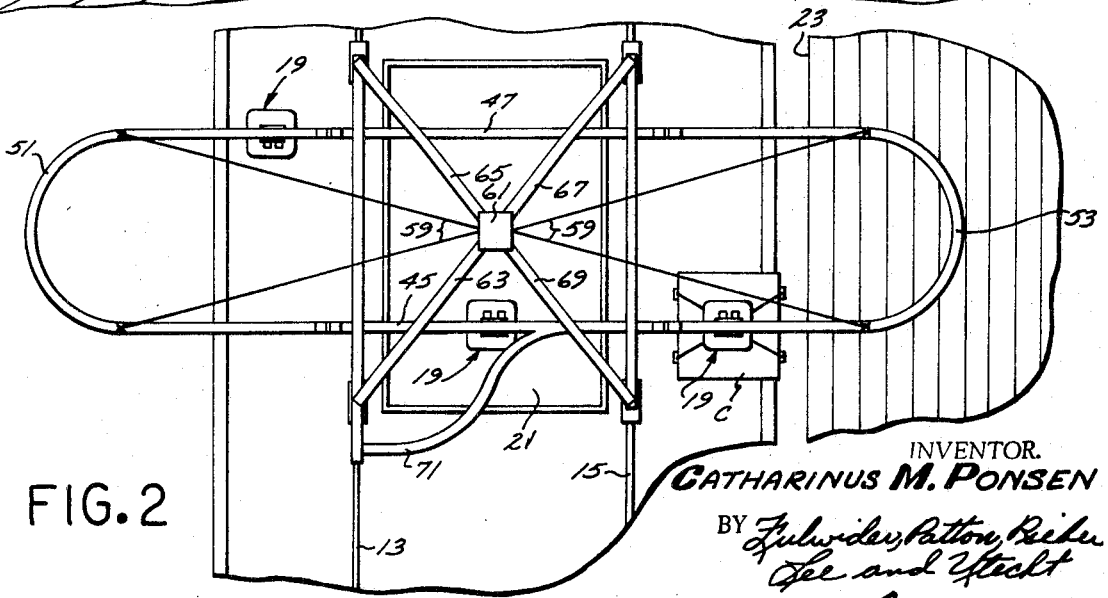
FIG. 2 is a top view, in reduced scale, of the cargo handling apparatus shown in FIG. 1.
Figure 3:
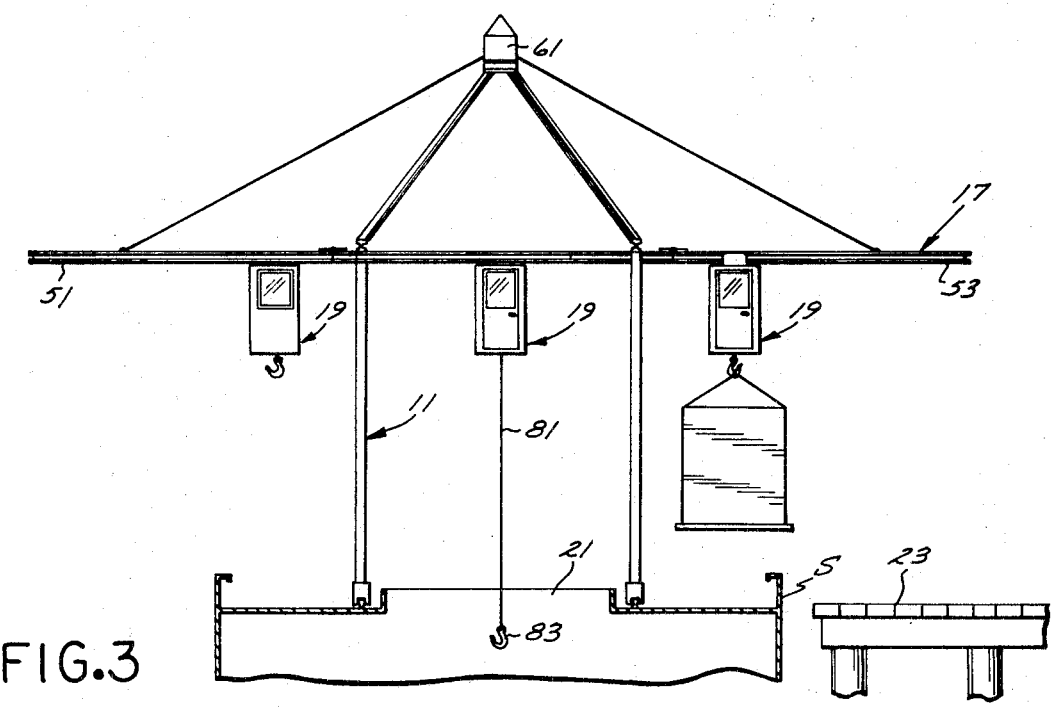
FIG. 3 is a front view of the cargo handling apparatus shown in FIG. 1.
Figure 4:
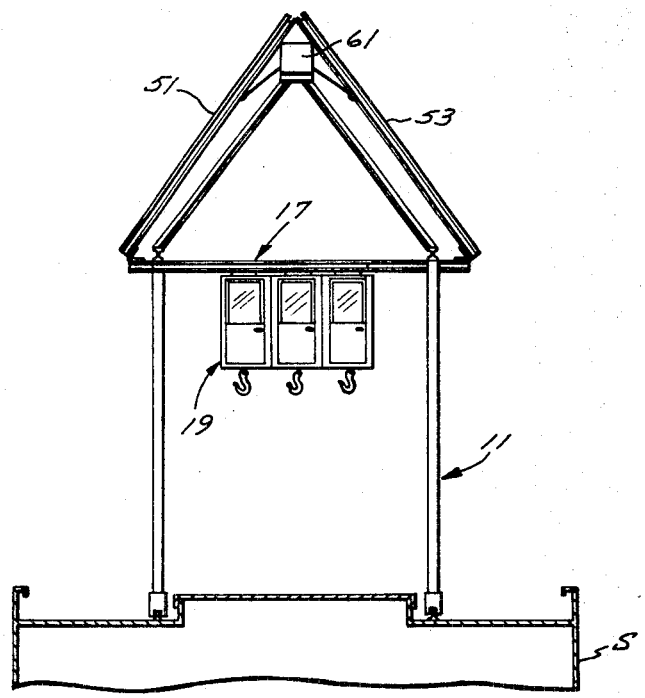
FIG. 4 is a front view similar to FIG. 3 and showing the track folded on itself.
Figure 5:
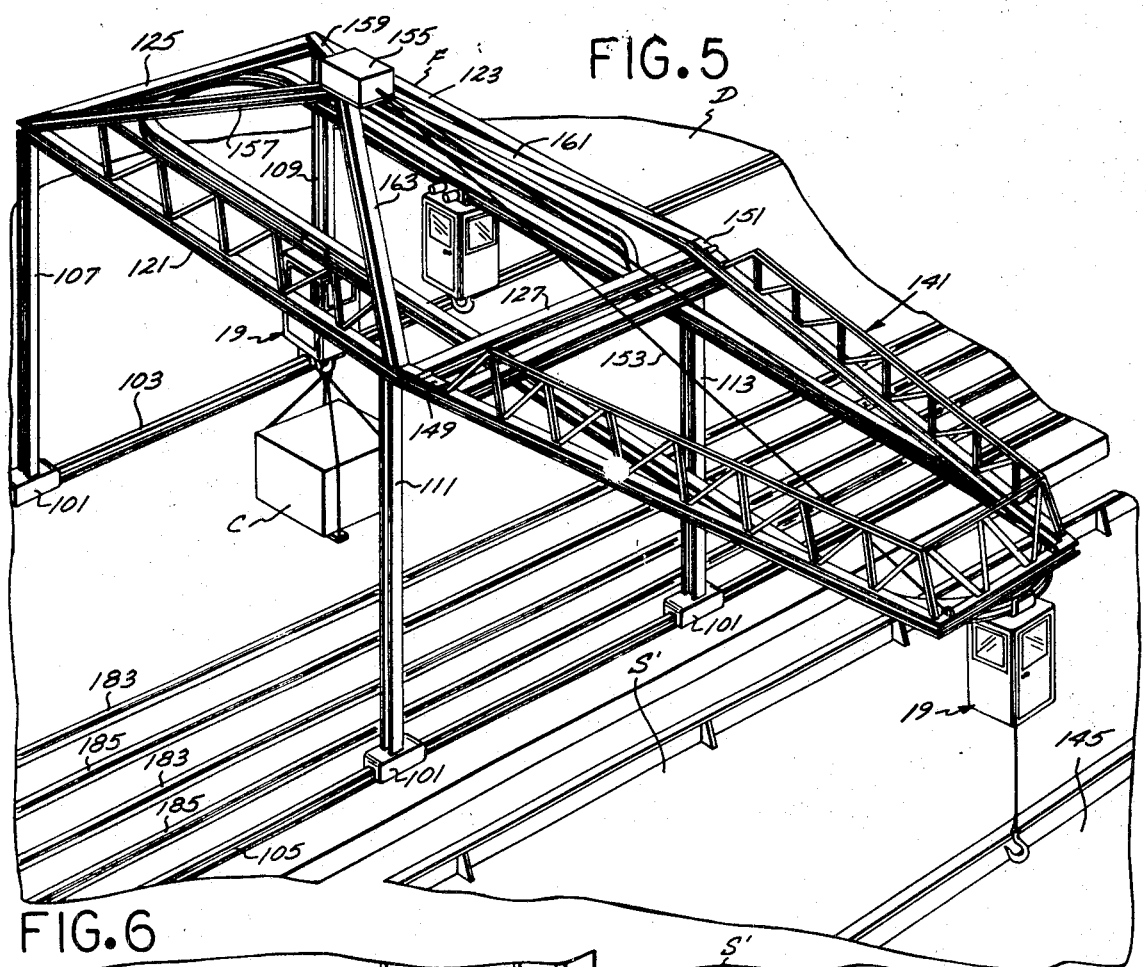
FIG. 5 is a perspective view of a second embodiment of the cargo handling apparatus of present invention.
Figure 6:
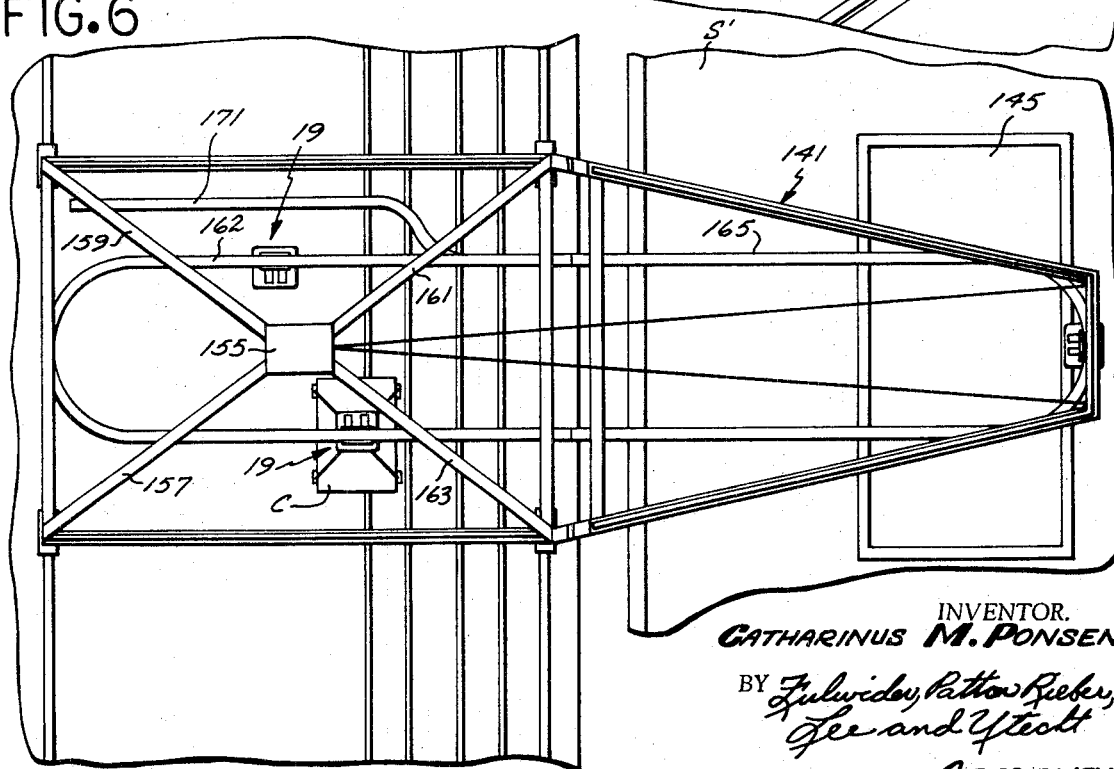
FIG. 6 is a top plan view of the cargo handling apparatus shown in FIG. 5.
Figure 7:
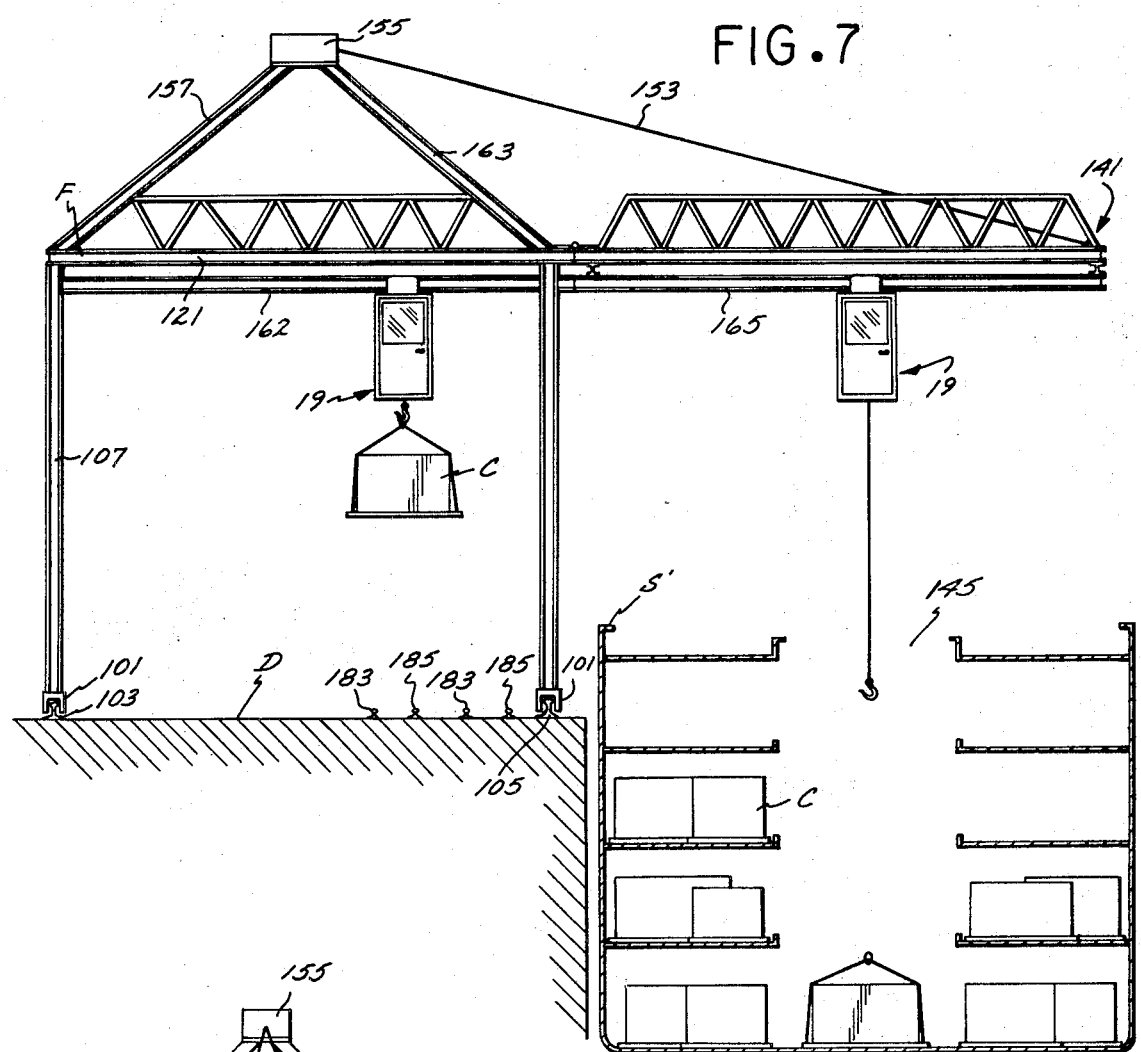
FIG. 7 is an elevational side view of the cargo handling apparatus shown in FIG. 5.
Figure 8:
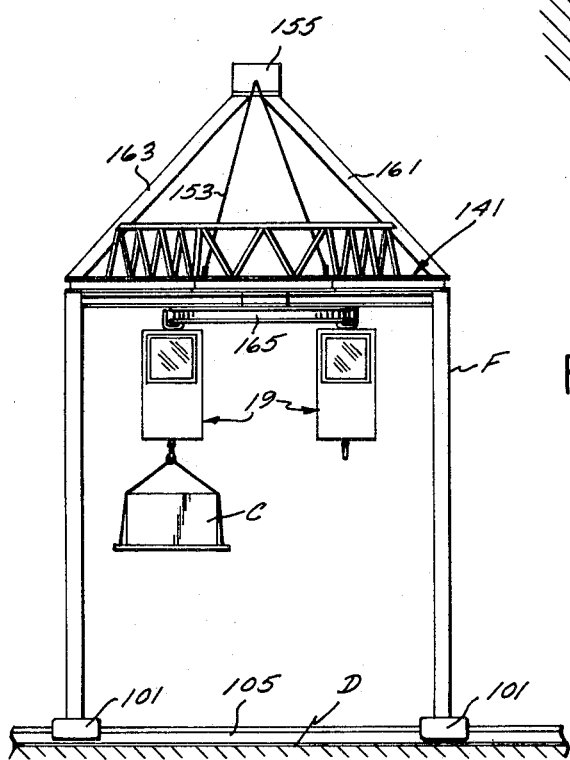
FIG. 8 is an elevational front view of the cargo handling apparatus shown in FIG. 5.

In operation, when the ship S has been maneuvered into position alongside a dock 23, the loop portions 51 and 53 of the track 17 are lowered into the positions shown in FIGS. 1 and 2. This may be accomplished by hydraulic cylinders (not shown) which push the upper extremities of the loop portions 51 and 53 outwardly from their folded position shown in FIG. 4. The cables 59 are then extended by unwinding their respective winches to lower the loop portions 51 and 53 to the positions shown in FIG. 1.

The hoist devices 19 are each individually operated by their own operator and are moved sequentially into position over the hatchway 21 and the respective hooks 83 lowered for receiving cargo C. The cargo C is then raised and the hoisting device 19 moved on around the track 17 under its own power to bring such cargo into position on the dock 23. The cargo C is then lowered onto the dock 23 and the hoisting device 19 will then move back into position over the hatchway 21 for receiving another load of cargo C.

The number of hoist devices 19 being utilized on the track 17 will vary depending on the amount of cargo to be discharged and the rapidity with which the hold crew can ready the cargo C for discharge. Consequently, hoisting devices 19 not being used may be diverted to the shunt track 71 thereby enabling the hoisting devices 19 remaining on the track 17 to sequentially and continuously move into position over the hatchway 21 for receiving cargo C to be disposed on the dock 23. It will be clear that the cargo handling apparatus may likewise be utilized to receive cargo from the dock 23 for disposition in the ship's hold through the hatchway 21.

When the ship has been loaded and is to get under way the frame 11 may be moved to one end of the tracks 13 and 15 and secured. The projecting track portions 51 and 53 will be folded back to the position shown in FIG. 4 to retract them from projection beyond the sides of the ship's hull.

Referring to FIGS. 5 through 8, the cargo handling apparatus shown therein includes two pairs of trucks 101 which are mounted on rails 103 and 105 installed on a dock D and extending longitudinally of a ship S' moored at such dock. The trucks 101 mount a frame F comprising four corner posts 107, 109, 111 and 113. The posts 107, 109, 111 and 113 are secured together on their upper ends by means of a rectangular frame including transverse beams 121 and 123 which are connected together on their opposite ends by longitudinal beams 125 and 127.

A U-shaped boom, generally designated 141, is mounted from one side of the frame F and extends over the hatchway 145 of a ship S'. The U-shaped boom 141 is connected on its inner end to the frame F by means of a pair of hinge assemblies 149 and 151. The free end of the boom 141 is supported by a pair of cables 151 and 153 which are selectively unreeled from a winch housed in a box-structure 155 supported centrally over the frame F by means of upwardly and inwardly converging beams 157, 159, 161 and 163.

Suspended from the frame F is a U-shaped track 162 section which mounts a plurality of hoisting devices 19. A track portion 165, which is a mirror image of the track section 162, is suspended from the boom 141 and cooperates with such track section 162 to form an endless loop.

A shunt track 171 (FIGS. 5 and 6) is provided for shunting unused one of the hoisting devices 19 off the main track.

Operation of the cargo handling apparatus shown in FIGS. 5 through 8 is substantially the same as that for the device described above except that the boom 141 is lowered into position over the ship S' and the hoisting devices selectively operated to remove the cargo C from the ship S' or to load such cargo thereonto When the cargo transfer is completed the boom 141 is raised to clear the way for the ship S' and for arrival of a different ship. It will be noted that the frame F straddles two pairs of railroad tracks 183 and 185 whereby the cargo may be transferred directly to or from railroad cars.

From the foregoing, it will be apparent that the cargo handling apparatus of present invention provides means for rapidly loading and unloading cargo from a ship's hold whereby the ship may be rapidly unloaded and reloaded to avoid the expense of waiting at the dock while conventional inefficient unloading devices are utilized.

Various modifications and changes may be made with regard to the foregoing detailed description without departing from the spirit of the invention.

I claim:

1. Cargo handling apparatus for transferring cargo between a ship having a hatchway and a dock, said apparatus comprising:
   a frame mounted on said ship;
   an endless track formed with a closed loop and including a dock section for projection over said dock and a pair of coextensive sections on opposite sides, one of said coextensive sections defining a hatchway section for disposition over said hatchway during operation of said apparatus and the other coextensive section defining a return section;
   a plurality of trolleys mounted on said track;
   drive means for driving said trolleys independently of one another;
   hoists carried by the respective trolleys and including cargo engaging means for being lowered through said hatchway; and
   drive motors for said respective hoists whereby said frame may be positioned with said dock sections projecting over said dock and said hatchway section positioned over said hatchway and said hoists may be moved sequentially over said hatchway, said hoists operated to lower the respective cargo engaging means through said hatchway to engage cargo, said hoists then operated to withdraw said cargo from the hold of said ship and said respective trolleys then sequentially advanced along said return section and to said dock section and said hoists lowered to deposit said cargo on said dock and said respective hoists then advanced to said hatchway section to again repeat the foregoing process.

2. Cargo handling apparatus as set forth in claim 1 wherein said coextensive sections extend parallel to one another.

3. Cargo handling apparatus as set forth in claim 2 wherein:
   said track includes hinge means connecting said dock section with said coextensive sections whereby said dock section may be folded back when said ship is under way.

4. Cargo handling apparatus as set forth in claim 1 wherein said ship includes a plurality of hatchways and said apparatus includes:
   rails disposed on the deck of said ship and extending adjacent said hatchways; and
   trucks riding on said rails and carrying said support frame for moving said track between said hatchways.

5. Cargo handling apparatus as set forth in claim 1 wherein said track includes hinge means connecting said dock section with said coextensive sections whereby said dock section may be folded back when said ship is under way.

6. Cargo handling apparatus as set forth in claim 5 that includes means connected with said dock section for folding said dock section.